(12) United States Patent
Kitagawa et al.

(10) Patent No.: US 7,529,498 B2
(45) Date of Patent: May 5, 2009

(54) IMAGE FORMING DEVICE HAVING CHARGING ROLLER AND CLEANING MEMBER

(75) Inventors: Yusuke Kitagawa, Saitama (JP);
Masato Serizawa, Kanagawa (JP);
Osamu Handa, Kanagawa (JP);
Mitsuhiro Matsumoto, Kanagawa (JP);
Junichi Ozawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 235 days.

(21) Appl. No.: 11/481,960

(22) Filed: Jul. 7, 2006

(65) Prior Publication Data
US 2007/0098435 A1 May 3, 2007

(30) Foreign Application Priority Data
Nov. 2, 2005 (JP) ............................. 2005-319952

(51) Int. Cl.
*G03G 15/01* (2006.01)
(52) U.S. Cl. ....................................... 399/100; 399/174
(58) Field of Classification Search ................. 399/100, 399/174, 176
See application file for complete search history.

(56) References Cited
U.S. PATENT DOCUMENTS
2005/0191081 A1 * 9/2005 Muraishi et al. ............ 399/100
2006/0115292 A1 6/2006 Sampe et al. ............... 399/100

FOREIGN PATENT DOCUMENTS

| JP | 64-35464 A | 2/1989 |
|---|---|---|
| JP | 07-140763 | 6/1995 |
| JP | 11-133767 A | 5/1999 |
| JP | 11-160973 A | 6/1999 |
| JP | 2001-75377 A | 3/2001 |
| JP | 2003-122094 | 4/2003 |
| JP | A-2005-134760 | 5/2005 |
| JP | 2005-301216 | 10/2005 |

* cited by examiner

*Primary Examiner*—Hoang Ngo
(74) *Attorney, Agent, or Firm*—Morgan, Lewis & Bockius LLP

(57) ABSTRACT

An image forming device includes a charging roller that charges a body-to-be-charged by press-contacting and is rotated by the rotating body-to-be-charged, a first receiving portion that supports a supporting portion provided at the charging roller, and causes the charging roller to press-contact the body-to-be-charged, a cleaning member that press-contacts a surface of the charging roller and cleans the charging roller, and a second receiving portion that supports a supporting portion provided at the cleaning member, and causes the cleaning member to press-contact the charging roller. At least one of the first and second receiving portions imparts a degree of freedom at a first receiving portion side to the supporting portion of the charging roller in a direction of press-contacting the body-to-be-charged, and imparts a degree of freedom at a second receiving portion side to the supporting portion of the cleaning member in a direction of press-contacting the charging roller.

11 Claims, 12 Drawing Sheets

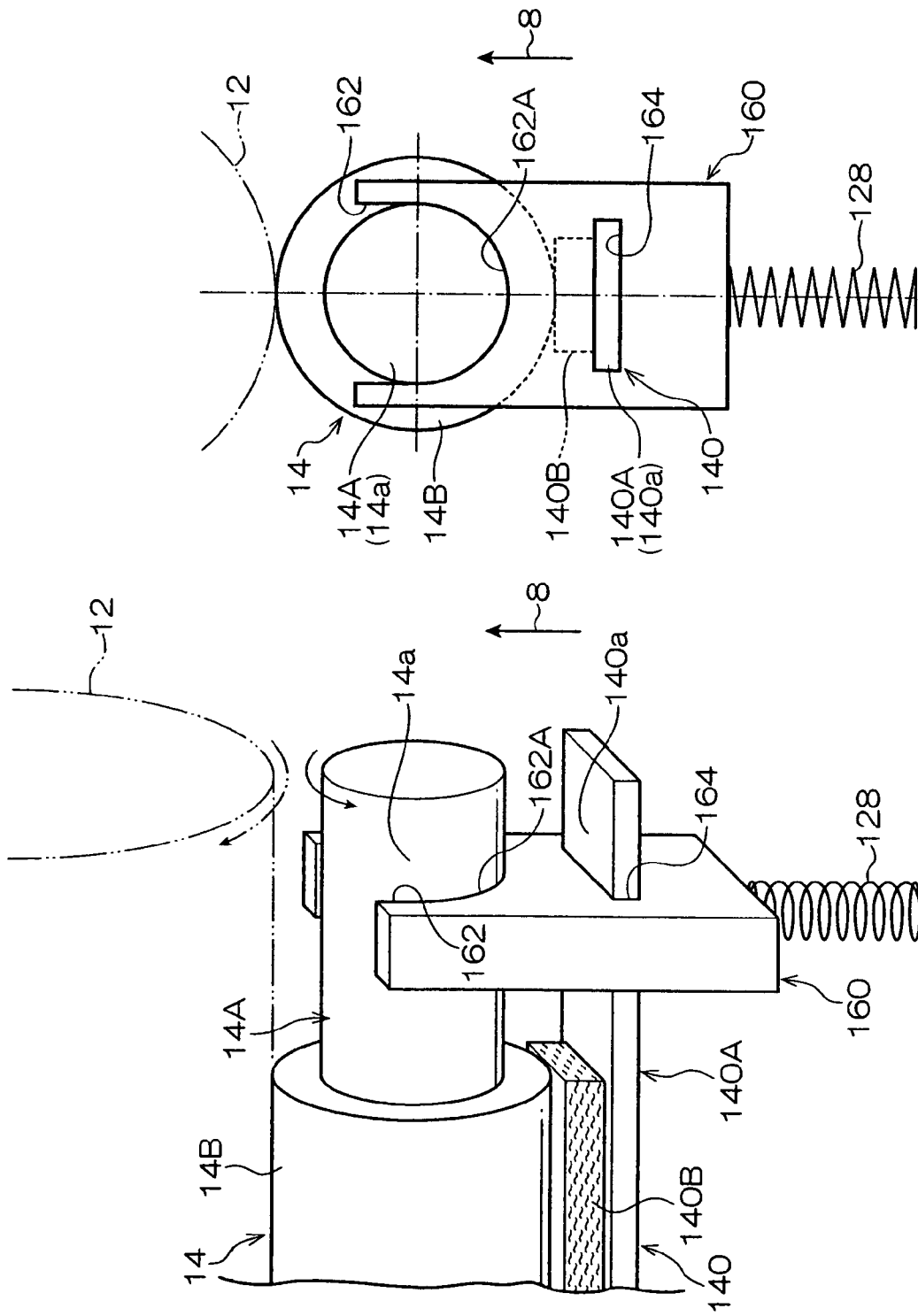

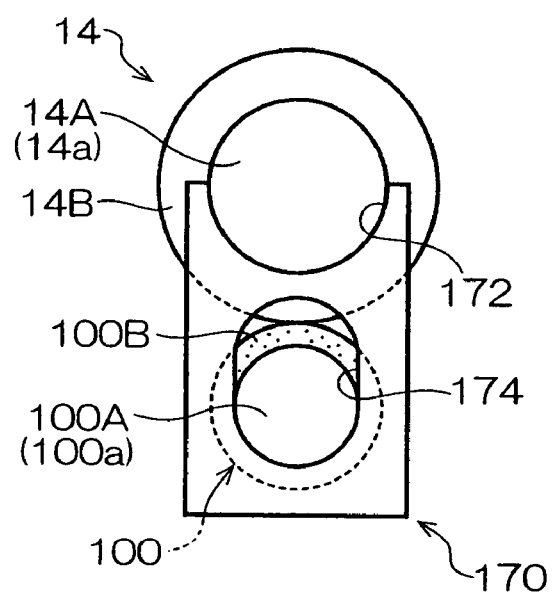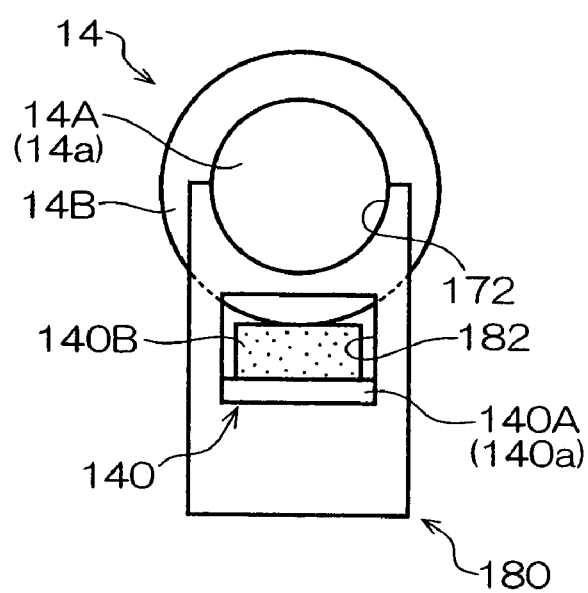
F I G. 10 AF I G. 10 B

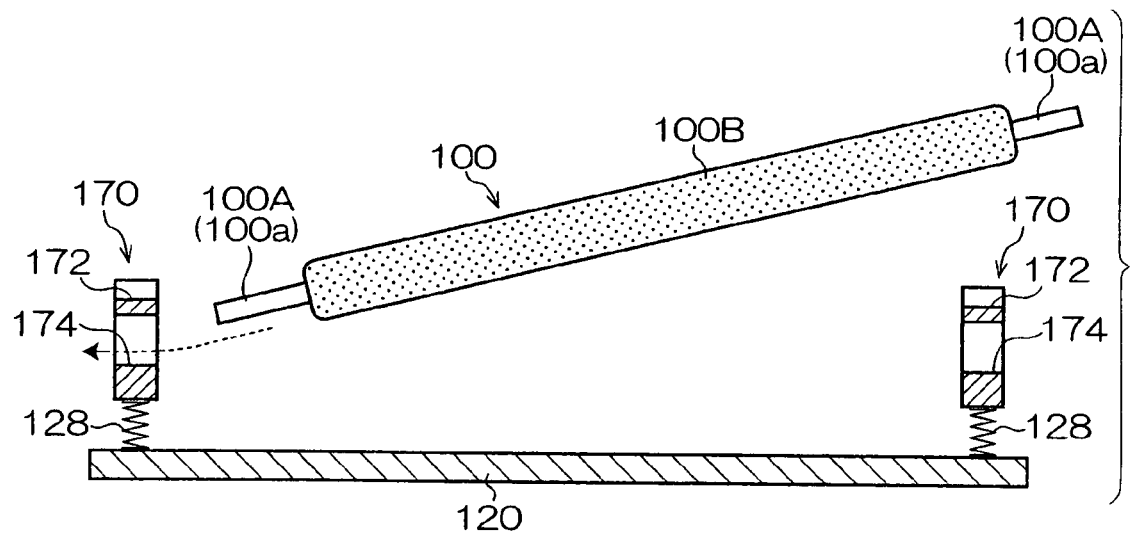
F I G. 1 1 A
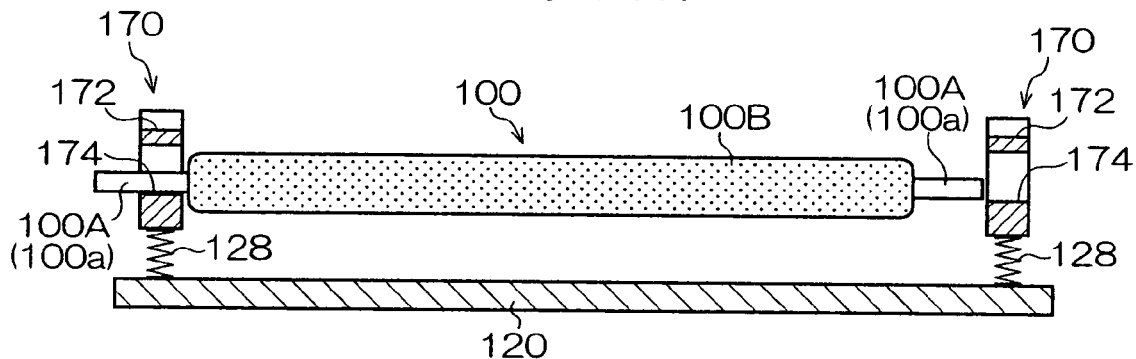
F I G. 1 1 B
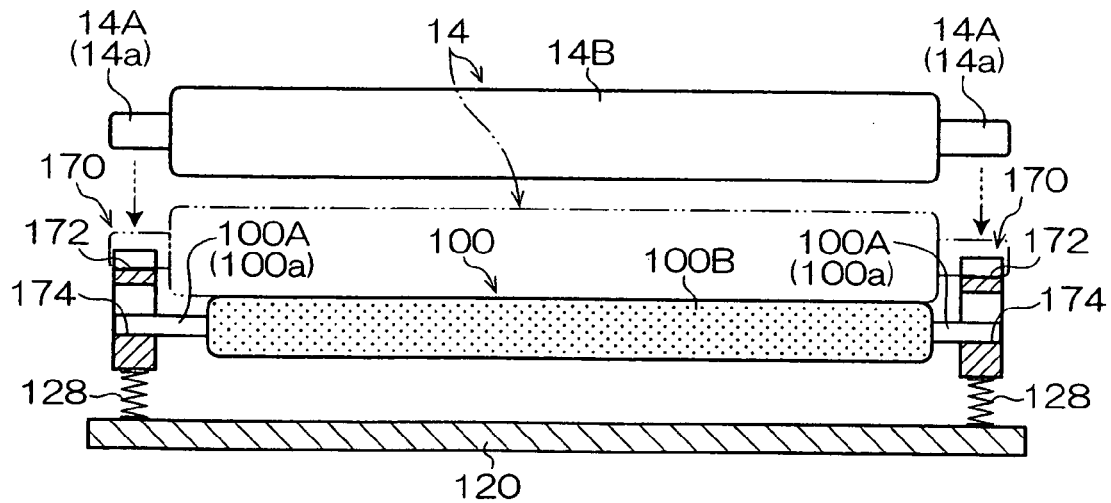
F I G. 1 1 C

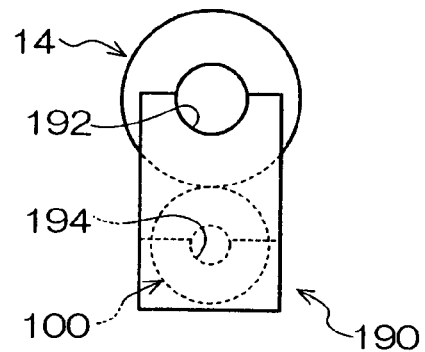
F I G. 1 2 A
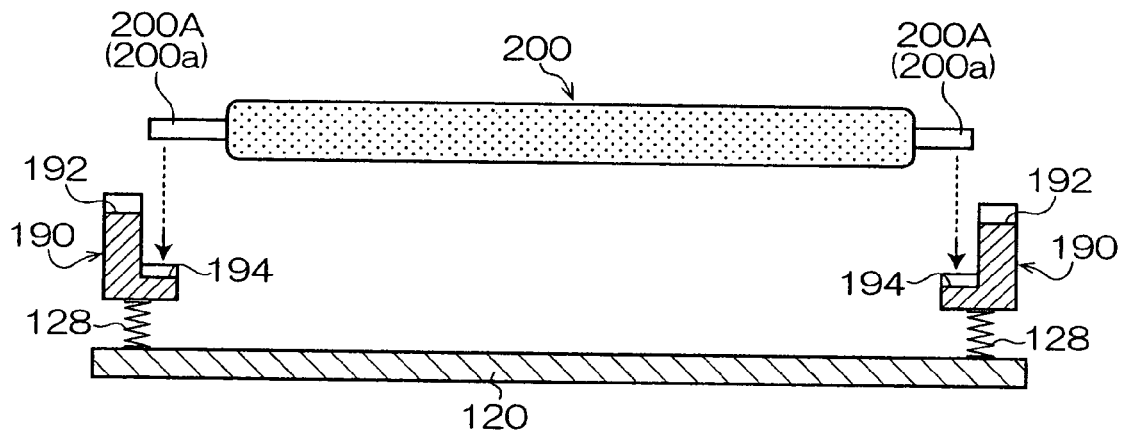
F I G. 1 2 B
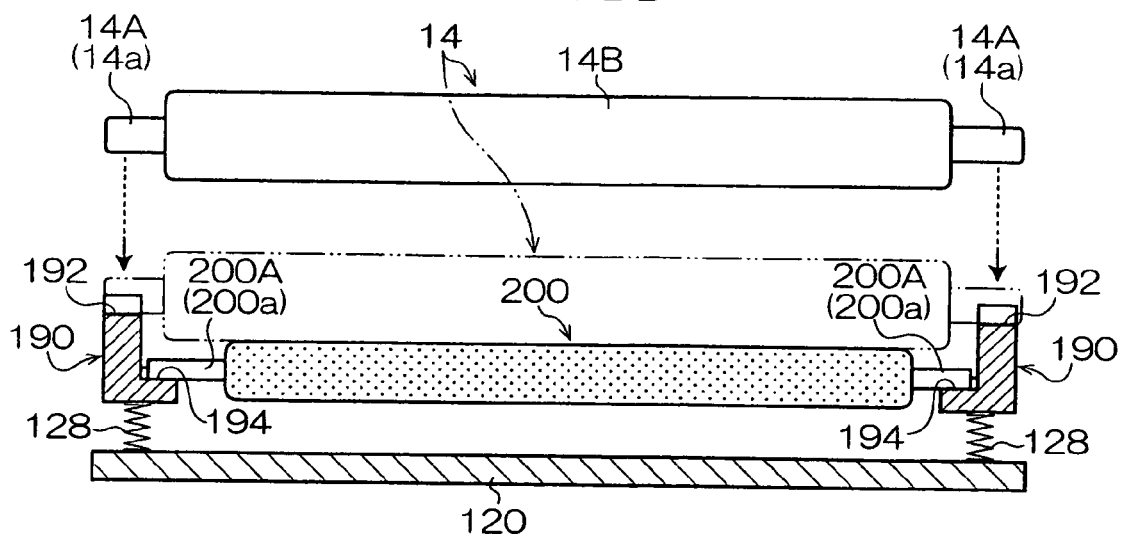
F I G. 1 2 C

IMAGE FORMING DEVICE HAVING CHARGING ROLLER AND CLEANING MEMBER

BACKGROUND

1. Technical Field

The present invention generally relates to an image forming device, such as a copier or a printer or the like, which uses an electrophotographic method. More particularly, the present invention relates to an image forming device having a contact-charging type charging roller which, while rotating in contact with an image carrier which is driven to rotate, charges the surface of the image carrier, and a cleaning member for the charging roller.

2. Related Art

Conventionally, devices utilizing corona discharge development, such as scorotron chargers, have been used as charging devices of image forming devices such as copiers or printers or the like which adopt an electrophotographic method. However, in the case of a charging device which uses corona discharge development, the generating of ozone and nitrogen oxides, which adversely affect human bodies and the global environment, is problematic. In contrast, with a contact-charging method which carries out charging of an image carrier by causing an electrically-conductive charging roller to directly contact an image carrier, the generating of ozone and nitrogen oxides is greatly decreased, and the power efficiency thereof is also good. Therefore, the contact-charging type method has become the mainstream method recently.

In such a contact-charging method charging device, because the charging roller is always contacting the image carrier, there is the problem that it is easy for contamination due to foreign matter adhering to the surface of the charging roller to arise. At the downstream side of the transfer process, the surface of the image carrier, at which the image forming operation is repeatedly carried out, goes through a cleaning process which removes foreign matter such as residual toner and the like after the transfer. Thereafter, the surface of the image carrier enters into the area of the charging process. However, even after going through the cleaning process, minute particles which are smaller than the toner, such as portions of the toner or external additives of the toner or the like, remain on the image carrier without being cleaned, and adhere to the surface of the charging roller. The foreign matter adhering to the surface of the charging roller causes non-uniformity in the surface resistance value of the charging roller, and abnormal discharging or unstable discharging occurs, and the uniformity of charging deteriorates.

In order to overcome this problem, there has been proposed a technique in which a cleaning member, which is formed from a plate-shaped sponge or a brush or the like, is made to press-contact (slidingly-contact) the surface of a charging roller which rotates, so as to clean the contamination on the surface of the charging roller. In this technique, the charging roller is rotatably supported at a housing (case), is urged by an urging member (spring) to press-contact a photosensitive body, and is thereby rotated by the photosensitive body. The cleaning member as well is urged by a separate urging member to press-contact the charging roller.

However, in the structure of the above-described technique, if errors in the precision of the alignment or changes over time arise between the charging roller and the cleaning member, or if flexure arises due to the press-contact force applied to each member, galling arises between the shaft-receiving portions and the end portions (supporting portions) of the rotating shaft of the charging roller, and the end portions locally contact the shaft-receiving portions strongly. Therefore, the rotation resistance increases, the ability of the charging roller to move following the photosensitive body deteriorates, and it is easy for defects in charging to arise. Further, in a structure in which the cleaning member is not a fixed-contact-type as in this technique, and rather is, for example, a rotating-contact-type which is rotated by the charging roller, due to the aforementioned poor alignment between the members or flexure caused by the application of press-contact force, the end portions (supporting portions) of the rotating shaft of the cleaning member locally contact the shaft-receiving portions strongly in the same way as at the charging roller. Therefore, the problem arises that the ability of the cleaning member to move following the charging roller deteriorates, leading to a deterioration in the cleaning ability.

SUMMARY

An aspect of the present invention is an image forming device including a charging roller that charges a body-to-be-charged by press-contacting and being rotated by the rotating body-to-be-charged; a first receiving portion that supports a supporting portion provided at the charging roller, and causes the charging roller to press-contact the body-to-be-charged; a cleaning member that press-contacts a surface of the charging roller and cleans the charging roller; a second receiving portion that supports a supporting portion provided at the cleaning member, and causes the cleaning member to press-contact the charging roller. At least one of the first receiving portion and/or the second receiving portion is a configuration which imparts a degree of freedom at a first receiving portion side to the supporting portion of the charging roller in a direction of press-contacting the body-to-be-charged, and imparts a degree of freedom at a second receiving portion side to the supporting portion of the cleaning member in a direction of press-contacting the charging roller.

BRIEF DESCRIPTION OF THE DRAWINGS

Exemplary embodiments of the present invention will be described in detail based on the following figures, in which:

FIG. 8A is a perspective view showing a state in which a charging roller and a sponge member according to a third exemplary embodiment of the present invention are rotatably supported at a shaft-receiving member;

FIG. 8B is a side view showing the state in which the charging roller and the sponge member according to the third exemplary embodiment of the present invention are rotatably supported at the shaft-receiving member;

FIGS. 10A and 10B are side views showing a state in which a charging roller and a sponge member according to a fourth exemplary embodiment of the present invention are rotatably supported at a shaft-receiving member;

FIGS. 11A through 11C are explanatory diagrams for explaining the order of mounting the charging roller and the sponge member to the shaft-receiving members according to the fourth exemplary embodiment of the present invention;

FIG. 12A is a side view showing a state in which a charging roller and a sponge member are rotatably supported at a shaft-receiving member according to a fifth exemplary embodiment of the present invention; and FIGS. 12B and 12C are explanatory diagrams for explaining the order of mounting the charging roller and the sponge member to the shaft-receiving members of FIG. 12A.

DETAILED DESCRIPTION

An image forming device according to exemplary embodiments of the present invention will be described hereinafter with reference to the drawings.

Figure 1:
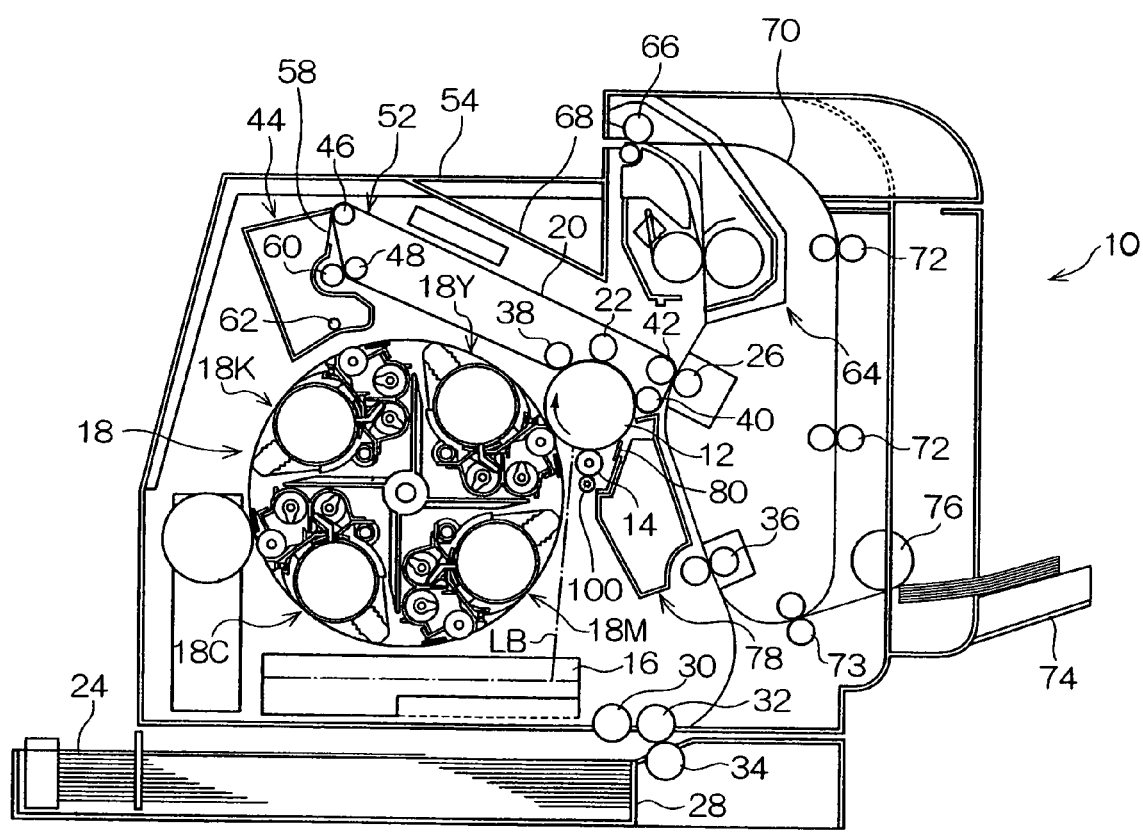
FIG. 1 is a structural diagram showing the schematic structure of an image forming device according to the exemplary embodiments of the present invention.

An image forming device 10 according to an exemplary embodiment of the present invention, which is shown in FIG. 1, is a four-cycle-type full-color laser printer. As shown in FIG. 1, a photosensitive drum 12 is disposed rotatably within the device, slightly toward the upper right of the center. For example, a structure which is formed from an electrically-conductive cylinder of a diameter of about 47 mm whose surface is covered by a photosensitive layer formed from OPC or the like, is used as the photosensitive drum 12. The photosensitive drum 12 is driven to rotate at a processing speed of about 150 mm/sec along the direction of the arrow by an unillustrated motor.

The surface of the photosensitive drum 12 is charged to a predetermined potential by a charging roller 14 which is disposed substantially directly beneath the photosensitive drum 12. Thereafter, image exposure by a laser beam LB is carried out by an exposure device 16, which is disposed lower than the charging roller 14, such that electrostatic latent images corresponding to image information are formed.

The electrostatic latent images formed on the photosensitive drum 12 are developed by a rotating-type developing device 18, at which developing devices 18Y, 18M, 18C, 18K of the respective colors of yellow (Y), magenta (M), cyan (C), and black (K) are disposed along the peripheral direction, such that toner images of predetermined colors are formed.

At this time, the respective processes of charging, exposure, and developing are repeated a predetermined number of times on the surface of the photosensitive drum 12, in accordance with the colors of the image to be formed. In the developing process, the rotating-type developing device 18 is rotated, and the developing devices 18Y, 18M, 18C, 18K of the corresponding colors move to a developing position opposing the photosensitive drum 12.

When forming a full-color image, for example, the respective processes of charging, exposure, and developing are repeated four times on the surface of the photosensitive drum 12 in correspondence with the respective colors of yellow (Y), magenta (M), cyan (C), and black (K), such that toner images corresponding to the respective colors of yellow (Y), magenta (M), cyan (C), and black (K) are successively formed on the surface of the photosensitive drum 12. In forming the toner images, the number of times that the photosensitive drum 12 rotates differs in accordance with the size of the image. However, for example, in the case of an A4 size image, one image is formed by the photosensitive drum 12 rotating three times. Namely, each time the photosensitive drum 12 rotates three times, toner images corresponding to the respective colors of yellow (Y), magenta (M), cyan (C), and black (K) are formed on the surface of the photosensitive drum 12.

The toner images of the respective colors of yellow (Y), magenta (M), cyan (C), and black (K), which are successively formed on the photosensitive drum 12, are, at a primary transfer position where an intermediate transfer belt 20 is trained around the outer periphery of the photosensitive drum 12, transferred by a primary transfer roller 22 in a state of being superposed one on another on the intermediate transfer belt 20.

The yellow (Y), magenta (M), cyan (C), and black (K) toner images, which have been transferred in a superposed manner on the intermediate transfer belt 20, are transferred all at once by a secondary transfer roller 26 onto a recording sheet 24 which is fed at a predetermined time.

On the other hand, the recording sheets 24 are sent-out by a pick-up roller 30 from a sheet feeding cassette 28 disposed at the lower portion of the image forming device 10, and are fed in a state of being separated one-by-one by a feed roller 32 and a retard roller 34. The recording sheet 24 is conveyed by resist rollers 36 to the secondary transfer position of the intermediate transfer belt 20 in a state of being synchronous with the toner images which have been transferred onto the intermediate transfer belt 20.

The intermediate transfer belt 20 is stretched, at a predetermined tension, around: a wrap-in roller 38, which specifies the wrapping position of the intermediate transfer belt 20 at the photosensitive drum 12 at the rotating direction upstream side; the primary transfer roller 22 transferring the toner images, which are formed on the photosensitive drum 12, onto the intermediate transfer belt 20; a wrap-out roller 40, defining the wrapping position of the intermediate transfer belt 20 at the downstream side of the wrapping position; a back-up roller 42, abutting the secondary transfer roller 26 via the intermediate transfer belt 20; and a first cleaning back-up roller 46 and a second cleaning back-up roller 48, which oppose a cleaning device 44 of the intermediate transfer belt 20. The intermediate transfer belt 20 circulates at a predetermined processing speed (about 150 mm/sec), for example being driven in to follow the rotation of the photosensitive drum 12.

Here, in order to make the image forming device 10 compact, the intermediate transfer belt 20 is structured such that the cross-sectional configuration over which the intermediate transfer belt 20 is stretched is a flat, slender, substantial trapezoid.

An image forming unit 52 is structured integrally by the intermediate transfer belt 20, the photosensitive drum 12, the charging roller 14, the plural rollers 22, 38, 40, 42, 46, 48 over which the intermediate transfer belt 20 is stretched, the cleaning device 44 for the intermediate transfer belt 20, and a cleaning device 78 for the photosensitive drum 12 which will be described later. Therefore, by opening a top cover 54 of the image forming device 10 and manually lifting-up a handle (not shown) provided at the top portion of the image forming unit 52, the entire image forming unit 52 can be removed from the image forming device 10.

The cleaning device 44 of the intermediate transfer belt 20 has a scraper 58 which is disposed so as to abut the surface of the intermediate transfer belt 20, stretched by the first cleaning back-up roller 46, and a cleaning brush 60 disposed so as to press-contact the surface of the intermediate transfer belt 20, stretched by the second cleaning back-up roller 48. The residual toner, paper dust, and the like which are removed by the scraper 58 and the cleaning brush 60 are recovered at the interior of the cleaning device 44.

The cleaning device 44 is disposed so as to be able to swing counterclockwise in the figure around a swinging shaft 62. The cleaning device 44 is withdrawn to a position separated from the surface of the intermediate transfer belt 20, up until the secondary transfer of the toner image of the final color is finished. When the secondary transfer of the toner image of the final color is finished, the cleaning device 44 abuts the surface of the intermediate transfer belt 20.

The recording sheet 24, on which the toner images have been transferred from the intermediate transfer belt 20, is conveyed to a fixing device 64. The recording sheet 24 is heated and pressurized by the fixing device 64, such that the toner images are fixed onto the recording sheet 24. Thereafter, in the case of singled-sided printing, the recording sheet 24 on which the toner images have been fixed is discharged-out as is by discharge rollers 66 onto a catch tray 68 provided at the top portion of the image forming device 10.

On the other hand, in the case of double-sided printing, the recording sheet 24, on whose first surface (obverse) the toner images have been fixed by the fixing device 64, is not discharged-out as is onto the catch tray 68 by the discharge rollers 66. In a state in which the trailing end portion of the recording sheet 24 is nipped by the discharge rollers 66, the discharge rollers 66 are rotated reversely. The conveying path of the recording sheet 24 is switched to a sheet conveying path 70 for double-sided printing. In a state in which the obverse and reverse of the recording sheet 24 are reversed, the recording sheet 24 is again conveyed to the secondary transfer position of the intermediate transfer belt 20 by conveying rollers 72 disposed at the sheet conveying path 70 for double-sided printing, and toner images are transferred onto the second surface (the reverse) of the recording sheet 24. Then, the toner images of the second surface (reverse) of the recording sheet 24 are fixed by the fixing device 64, and the recording sheet 24 is discharged-out onto the catch tray 68.

As an option for the image forming device 10, a manual feed tray 74 can be attached to the side surface of the image forming device 10 so as to freely opened and closed. The recording sheet 24 of an arbitrary size and type which is placed on this manual feed tray 74 is fed by a feed roller 76, and is conveyed to the secondary transfer position of the intermediate transfer belt 20 via conveying rollers 73 and the resist rollers 36. An image can thereby be formed as well on the recording sheet 24 of an arbitrary size and type.

Each time the photosensitive drum 12 rotates one time, residual toner and paper dust and the like are removed from the surface of the photosensitive drum 12, after the transfer process of the toner images has been completed, by a cleaning blade 80 of the cleaning device 78 which is disposed obliquely beneath the photosensitive drum 12, so as to prepare for the next image forming process.

Figure 2:
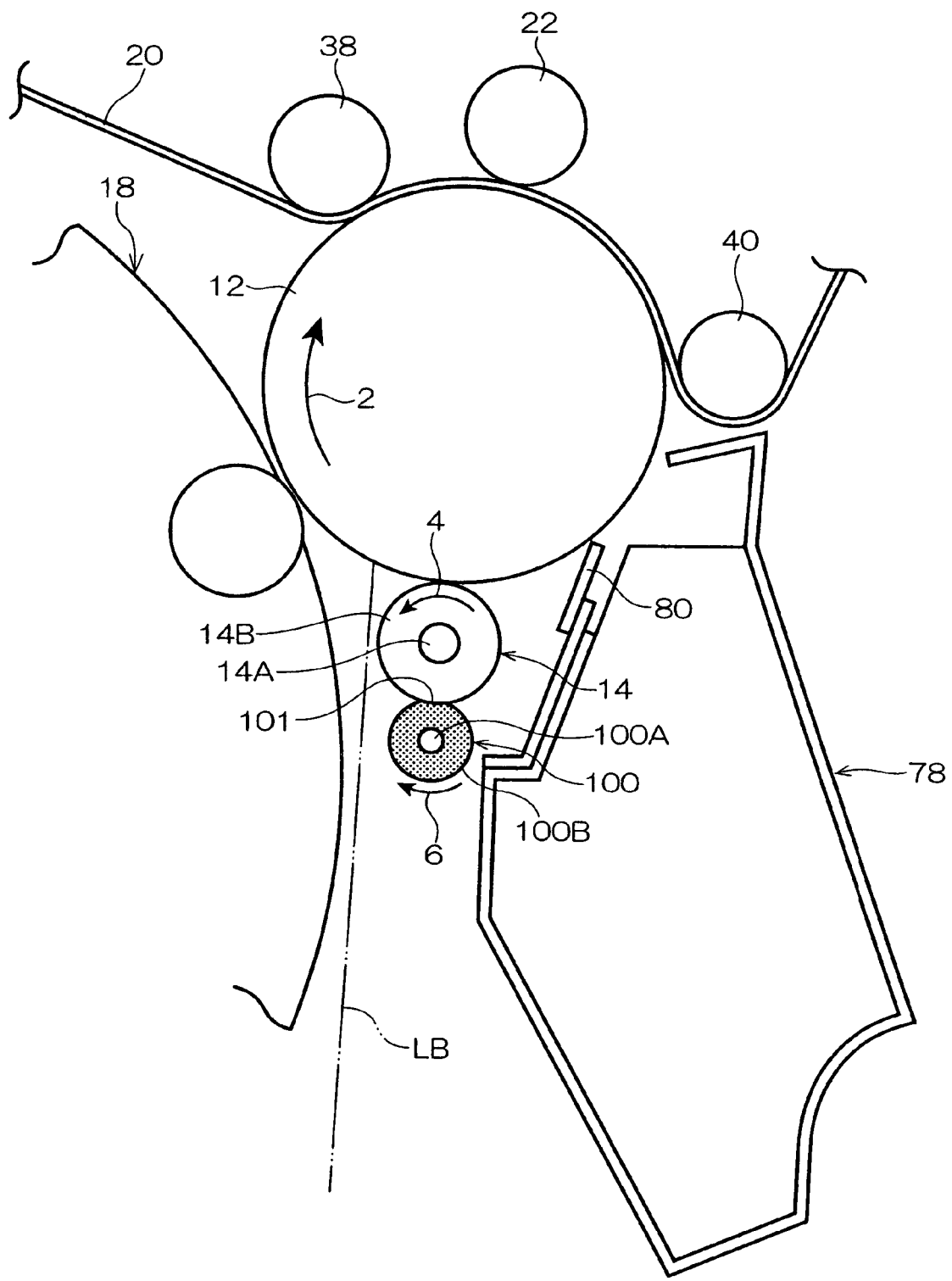
FIG. 2 is an enlarged view showing the structures of a photosensitive drum, a charging roller, and a sponge member provided in the image forming device of FIG. 1.

As shown in FIG. 2, the charging roller 14 is disposed beneath the photosensitive drum 12, so as to contact the photosensitive drum 12. The charging roller 14 is structured such that a charging layer 14B is formed on the periphery of an electrically-conductive shaft 14A, and the shaft 14A is supported rotatably. A sponge member 100, which is shaped as a roller and which contacts the surface of the charging roller 14, is provided beneath the charging roller 14 at the side opposite the photosensitive drum 12. The sponge member 100 is structured such that a sponge layer 100B is formed on the periphery of shaft 100A, and the shaft 100A is supported rotatably.

The sponge member 100 is pushed against the charging roller 14 at a predetermined load, such that the sponge layer 100B elastically deforms along the peripheral surface of the charging roller 14 and forms a nip portion 101. The photosensitive drum 12 is driven to rotate clockwise in FIG. 2 (in the direction of arrow 2) by an unillustrated motor, and, due to the rotation of the photosensitive drum 12, the charging roller 14 is rotated in the direction of arrow 4. Further, due to the rotation of the charging roller 14, the roller-shaped sponge member 100 is rotated in the direction of arrow 6.

Due to the sponge member 100 being rotated by the charging roller 14, contamination (foreign matter), such as toner and external additives and the like, adhering to the surface of the charging roller 14 is cleaned by the sponge member 100. Then, this foreign matter is taken-in into the cells of the foam of the sponge member 100. When the foreign matter recovered within the cells coheres and becomes a proper size, the foreign matter is returned from the sponge member 100 to the photosensitive drum 12 via the charging roller 14, and is recovered at the cleaning device 78 which cleans the photosensitive drum 12. The cleaning performance is thereby maintained and continued.

Free-cutting steel, stainless steel, or the like is used as the material of the shaft 100A of the sponge member 100 which serves as the cleaning member of the charging roller 14. The material and the surface treatment method thereof are selected as occasion demands in accordance with the application, such as slidability or the like. A material which is not electrically-conductive may be made electrically-conductive by being subjected to a general processing such as plating or the like, or may of course be used as is. Further, because the sponge member 100 contacts the charging roller 14 via the sponge layer 100B at a proper nipping pressure, a material having strength such that it does not flex at the time of nipping, or a shaft diameter having sufficient rigidity with respect to the shaft length, is selected.

The sponge layer 100B is formed from a foam having a porous, three-dimensional structure. The material of the sponge layer 100B is selected from foamed resin or rubber such as polyurethane, polyethylene, polyamide, polypropylene or the like. Polyurethane, which is strong in terms of tear strength, tensile strength, and the like, is particularly preferably used so that the sponge layer 100B efficiently cleans foreign matter such as external additives and the like by sliding and rubbing against the charging roller 14 while being rotated thereby, and at the same time, the surface of the charging roller 14 is not scratched due to the rubbing of the sponge layer 100B, and also so that tearing and breakage do not arise over a long period of time.

At the charging roller 14, an electrically-conductive elastic layer and a surface layer are formed successively as the charging layer 14B on the electrically-conductive shaft 14A.

Free-cutting steel, stainless steel, or the like is used as the material of the shaft 14A. The material and the surface treatment method thereof are selected as occasion demands in accordance with the application, such as slidability or the like. A material which is not electrically-conductive may be made electrically-conductive by being subjected to a general processing such as plating or the like.

For example, elastic materials such as elastic rubbers or the like, electrically-conductive materials which adjust the resistance of the electrically-conductive elastic layer, such as carbon black or ionic electrically-conductive materials or the like, and as needed, materials which are usually added to rubber, such as softening agents, plasticizers, hardening agents, vulcanizing agents, vulcanization accelerators, antioxidants, fillers such as silica and calcium carbonate and the like, and the like may be added to the aforementioned electrically-conductive elastic layer, which configures the charging layer 14B of the charging roller 14. The electrically-conductive elastic layer is formed by covering the peripheral surface of the electrically-conductive shaft 14A with a mixture to which is added general rubber additive materials. A substance in which a material, such as carbon black or an ionic electrically-conductive agent, which conducts electricity as a charge carrier of electrons and/or ions, is blended and dispersed in a matrix material, can be used as an electrically-conductive agent for the purpose of adjusting the resistance value. Further, the aforementioned elastic material may be a foam.

The aforementioned surface layer structuring the charging layer 14B is formed in order to prevent contamination by foreign matter such as toner and the like, and the like. The material of the surface layer is not particularly limited, and any of resins, rubbers, or the like may be used. Examples includes polyester, polyimide, copolymer nylon, silicone resins, acrylic resins, polyvinylbutyral, ethylene-tetrafluoroethylene copolymers, melamine resins, fluororubbers, epoxy resins, polycarbonate, polyvinyl alcohol, cellulose, polyvinylidene chloride, polyvinyl chloride, polyethylene, ethylene-vinyl acetate copolymers, and the like.

The resistance value can be adjusted by including an electrically-conductive material in the surface layer. Materials having a particle diameter of less than or equal to 3 μm are desirably used as this electrically-conductive material.

A substance in which electrons and/or ions are dispersed as a charge carrier in a material which conducts electricity, such as carbon black or electrically-conductive metal oxide particles or an ionic electrically-conductive agent which are compounded in a matrix material, or the like can be used as an electrically-conductive agent whose purpose is to adjust the resistance value.

The electrically-conductive metal oxide particles, which are electrically-conductive particles for adjusting the resistance value, are particles which are electrically-conductive such as tin oxide, antimony-doped tine oxide, zinc oxide, anatase-type titanium oxide, ITO, and the like. Provided that the electrically-conductive metal oxide particles are an electrically-conductive agent which makes electrons be a charged carrier, any substance may be used and the substance is not particularly limited. These substances may be used alone, or two or more types thereof may be used in combination. Further, the particle diameter may be any particle diameter provided that it does not adversely affect the present invention. From the standpoints of adjusting the resistance value and strength, tin oxide, antimony-doped tin oxide, and anatase-type titanium oxide are preferable, and tin oxide and antimony-doped tin oxide are more preferable.

By carrying out control of the resistance by such an electrically-conductive material, the resistance value of the surface layer does not vary in accordance with the environment conditions, and a stable characteristic is obtained.

Moreover, fluorine resins or silicone resins may be used as the aforementioned surface layer. It is particularly preferable that the surface layer be structured of a fluorine-modified acrylate polymer. Further, particulates may be added in the surface layer. In this way, the surface layer becomes hydrophobic, and works to prevent the adhering of foreign matter to the charging roller 14. In addition, insulating particles such as alumina or silica can be added so as to provide the surface of the charging roller 14 with convexity and concavity, and make the burden at the time of sliding and rubbing against the photosensitive drum 12 small, and improve the mutual wear resistances of the charging roller 14 and the photosensitive drum 12.

First Exemplary Embodiment

A mounting structure of the charging roller 14 and the sponge member 100 according to a first exemplary embodiment of the present invention will be described in detail next.

Figure 3:
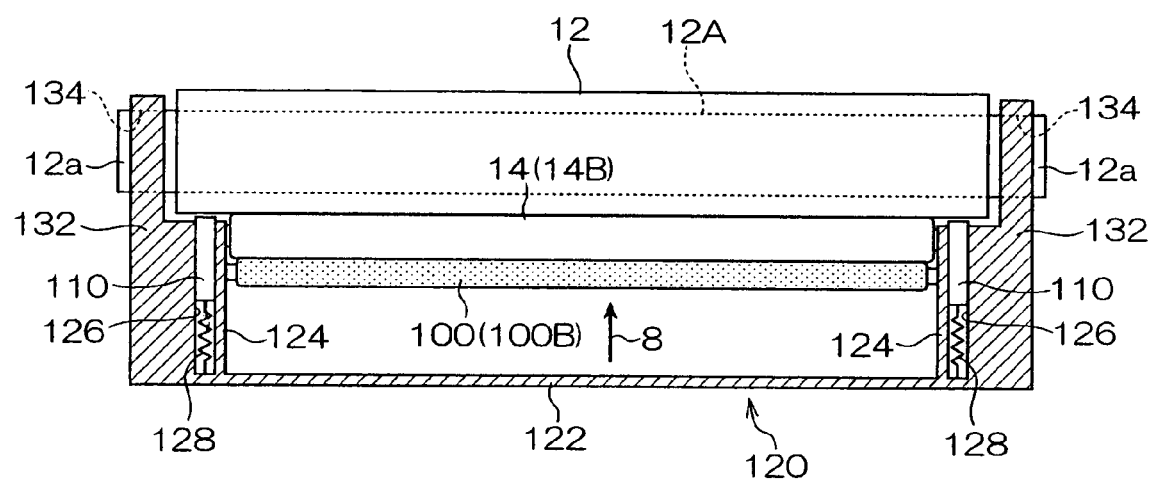
FIG. 3 is a partial sectional side view showing a mounting structure of a photosensitive drum, a charging roller, and a sponge member according to a first exemplary embodiment of the present invention.

As shown in FIG. 3, in this exemplary embodiment, the charging roller 14 and the sponge member 100 are assembled to a single frame 120 via a pair of shaft-receiving members 110, and are accommodated inside the frame 120. The photosensitive drum 12 as well is assembled to the frame 120, such that these members are made into a unit.

Figures 4A, 4B:
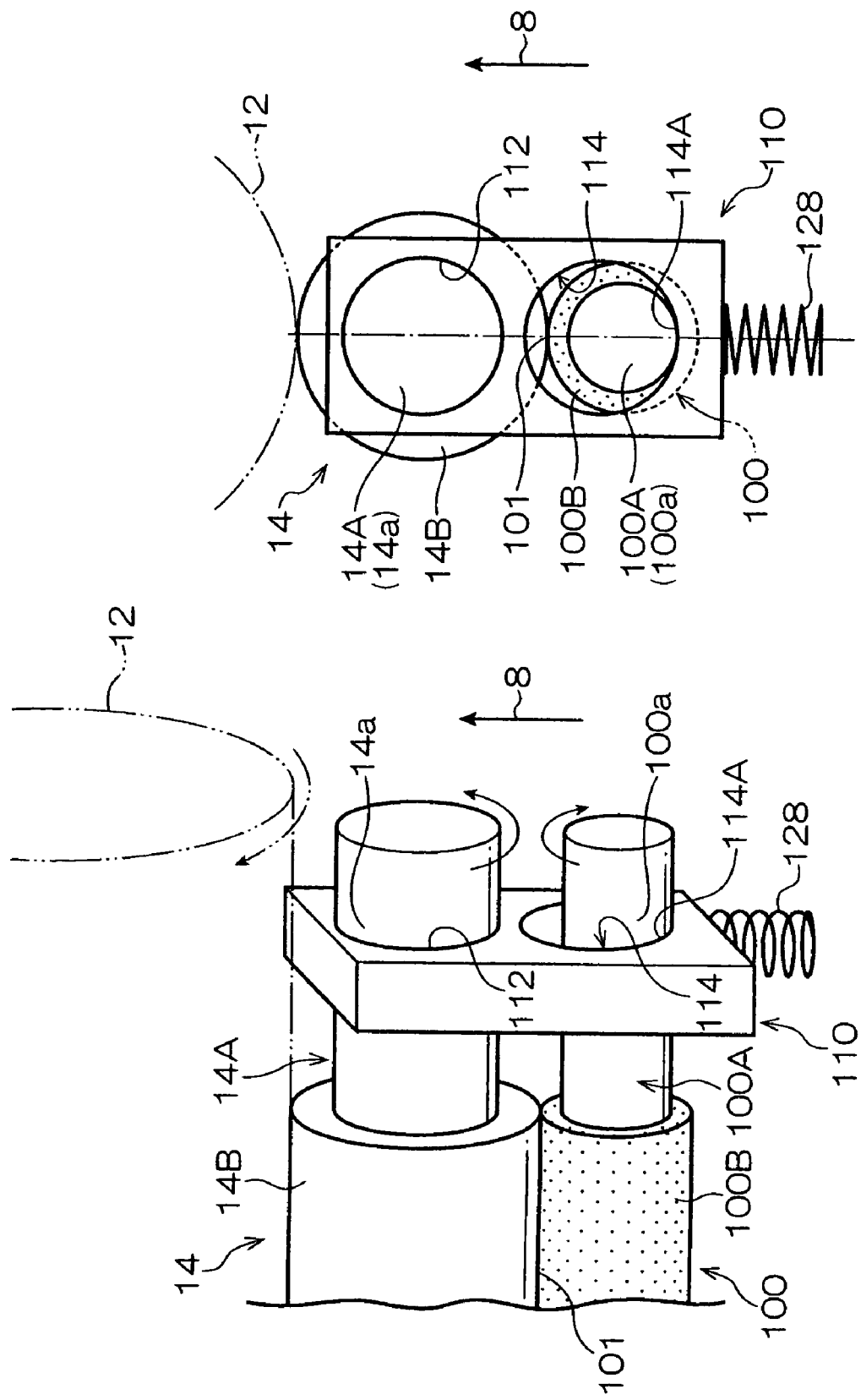
FIG. 4A is a perspective view showing a state in which the charging roller and the sponge member according to the first exemplary embodiment of the present invention are rotatably supported at a shaft-receiving member.
FIG. 4B is a side view showing the state in which the charging roller and the sponge member according to the first exemplary embodiment of the present invention are rotatably supported at the shaft-receiving member.

As shown in FIGS. 4A and 4B, one of the shaft-receiving members 110 is a singular structure formed in the shape of a flat rectangular parallelopiped (block shape). The shaft-receiving member 110 is formed of a synthetic resin material such as polyacetal or polycarbonate or the like having high rigidity, good slidability, and excellent wear-resistance. In order to further improve the wear-resistance, glass fibers or carbon fibers or the like may be contained in the synthetic resin material.

Two shaft-receiving holes 112, 114, which are disposed at a predetermined interval along the longitudinal direction (the vertical direction in FIGS. 4A and 4B), are formed in the shaft-receiving member 110. A supporting portion 14a provided at an end portion of the shaft 14A of the charging roller 14 is rotatably inserted through the one shaft-receiving hole 112. A supporting portion 100a provided at an end portion of the shaft 100A of the sponge member 100 is rotatably inserted through the other shaft-receiving hole 114. Further, as illustrated, the inner diameter of the shaft-receiving hole 114 is formed to be larger than the shaft diameter of the shaft 100A (the supporting portion 100a).

The relative positions are maintained substantially constant of the charging roller 14, the supporting portions 14a thereof at both ends of the shaft 14A being rotatably supported at the pair of shaft-receiving members 110, and the sponge member 100, the supporting portions 100a thereof at the both ends of the shaft 100A being rotatably supported at the pair of shaft-receiving members 110. This is due to the supporting portions 100a of the shaft 100A of the sponge member 100 abutting and being supported by inner peripheral surface portions 114A of the shaft-receiving holes 114 at the side opposite to that of the charging roller 14, due to the sponge member 100 being pushed against the charging roller 14 with a predetermined load. As described above, the sponge layer 100B elastically deforms along the peripheral surface of the charging roller 14 so as to form the nip portion 101 (see FIG. 2). The shaft-receiving holes 114, which abut and support the supporting portions 100a of the shaft 100A of the sponge member 100 in this way, are configurations which provide the supporting portions 100a of the shaft 100A with a degree of freedom in the direction of press-contacting the charging roller 14 (the direction of arrow 8).

As shown in FIG. 3, a pair of mounting portions 124, to which the above-described pair of shaft-receiving members 110 are mounted, are provided integrally at a main body portion 122 of the frame 120, at the both end portions (the left and right side end portions in FIG. 3) along the axial direction of the charging roller 14 and the sponge member 100.

Guide grooves 126, which run along the direction in which the mounting portions 124 extend, are formed in the mounting portions 124. The shaft-receiving members 110 are fit-into the guide grooves 126, are disposed at the distal end sides thereof, and can slide along the direction in which the mounting portions 124 extend (directions of approaching and moving away from the photosensitive drum 12) while being guided by the guide grooves 126.

The outer side surface sides of the pair of mounting portions 124 are formed to be thick, and the distal end sides thereof extend-out. A pair of shaft-receiving portions 132, which rotatably support the photosensitive drum 12, are provided at the distal end portions thereof. Shaft-receiving holes 134 are formed coaxially in the pair of shaft-receiving portions 132. Supporting portions 12a, which are provided at the end portions of the shaft 12A, are rotatably inserted through the shaft receiving holes 134, and the photosensitive drum 12 is, together with the charging roller 14 and the sponge member 100, assembled to the frame 120.

Compression coil springs 128, which urge the shaft-receiving members 110 toward the photosensitive drum 12, are provided at the proximal end sides within the guide grooves 126. Due to the spring forces of these compression coil springs 128, the shaft-receiving members 110 are urged toward the photosensitive drum 12 (in the direction of arrow 8), and the charging roller 14 press-contacts the photosensitive drum 12. In this way, when the photosensitive drum 12 rotates, the charging roller 14 is rotated accompanying the rotation of the photosensitive drum 12, and charges the photosensitive drum 12. Further, the sponge member 100 is rotated accompanying the rotation of the charging roller 14, and cleans the charging roller 14.

Operation of this exemplary embodiment will be described next.

Figure 5C:
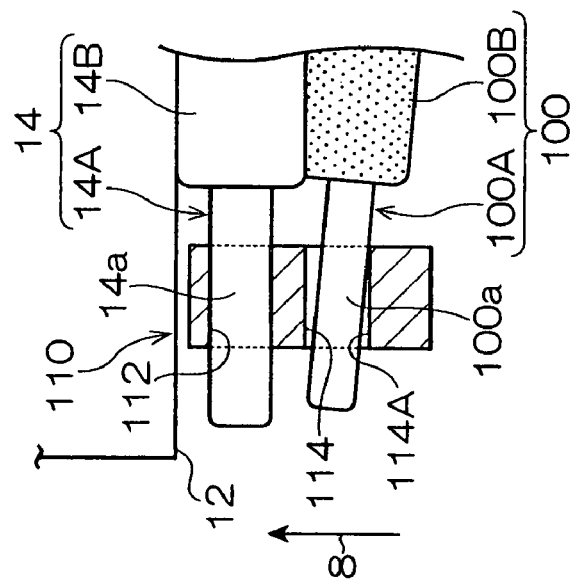
FIGS. 5A through 5C are explanatory diagrams for comparing and explaining improved effects of the mounting structure according to the first exemplary embodiment of the present invention, with respect to a conventional mounting structure of a charging roller and a sponge member.
Figure 5B:
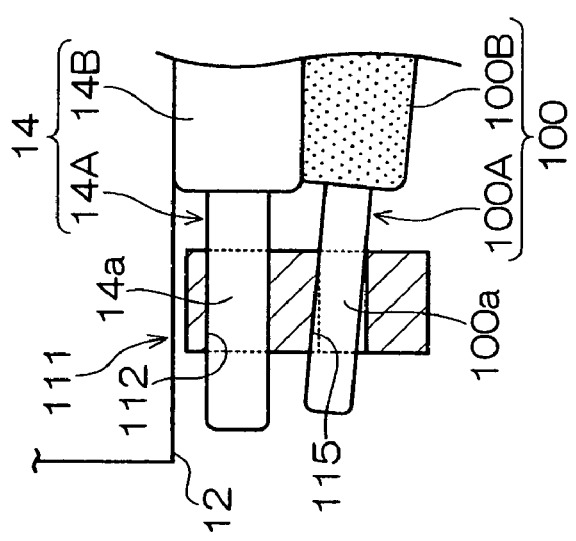
Figure 5A:
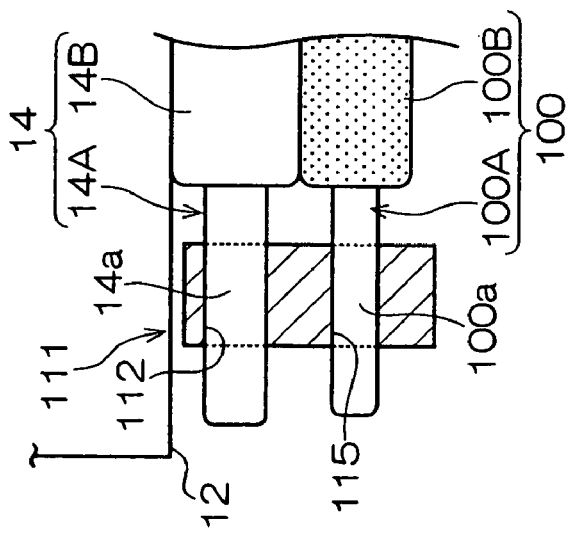

As shown in FIG. 5A, in a case in which the inner diameter of a shaft-receiving hole 115, which is formed in a shaft-receiving member 111 in order to support the sponge member 100, is substantially the same diameter as the shaft 100A (the supporting portion 100a), if errors in the accuracy of or changes over time in the alignment arise between the charging roller 14 and the sponge member 100, or if flexure arises at the sponge member 100 due to press-contact force, as shown in FIG. 5B, the supporting portion 100a of the shaft 100A of the sponge member 100 causes galling with the shaft-receiving hole 115 or causes the shaft-receiving hole 115 to deform, and strongly contacts it. Therefore, the rotation resistance increases, the ability of the sponge member 100 to move following the charging roller 14 becomes poor, and the cleaning ability deteriorates.

In contrast, in this exemplary embodiment, as shown in FIG. 5C, even if poor alignment or flexure arises at the sponge member 100, the supporting portion 100a of the shaft 100A can, in a state of being supported by the shaft-receiving hole 114 of the shaft-receiving member 110, be displaced and deform freely in the direction of press-contacting the charging roller 14 (the direction of arrow 8). In this way, an increase in rotation resistance due to a rise in the contact pressure is suppressed, and a deterioration in the ability to move following the charging roller 14 can be prevented. Accordingly, the cleaning ability of the charging roller 14 by the sponge member 100 is good.

Further, in this exemplary embodiment, the shaft-receiving hole 112 serving as a shaft-receiving portion (first receiving portion) which rotatably supports the charging roller 14, and the shaft-receiving hole 114 serving as a shaft-receiving portion (second receiving portion) which rotatably supports the sponge member 100, are provided at the single shaft-receiving member 110 and are structured integrally. At the same time, the supporting portions 14a of the both ends of the charging roller 14 and the supporting portions 100a of the both ends of the sponge member 100 are supported by the pair of shaft-receiving members 110, and the shaft-receiving members 110 are respectively urged toward the photosensitive drum 12 by the compression coil springs 128 (see FIGS. 4A and 4B). In this way, as compared with, for example, a structure in which the above-described two shaft-receiving portions (the first and second receiving portions) are provided at separate members, or a structure in which separate urging means are provided for the charging roller 14 and the sponge member 100, the charging roller 14 can be made to press-contact the photosensitive drum 12 and the sponge member 100 can be made to press-contact the charging roller 14 with a simple structure.

Further, for example, in the case of a fixed-contact-type cleaning member in which a pad member formed from an elastic body is pushed against the charging roller, or the like, it is easy for an increase in hardness to arise due to the accumulation or clogging of contamination at the portion which contacts the charging roller. However, if there is the rotating-contact-type sponge member 100 which is structured in the form of a roller which is rotated by the charging roller 14 as in this exemplary embodiment, such an increase in hardness does not occur, and therefore, a stable cleaning performance can be maintained. Moreover, by making the sponge member 100 be a rotating body, the frictional force applied to the surface of the charging roller 14 is small as compared with a structure such as that mentioned above in which a pad member which is an elastic body or the like is pushed against the charging roller 14. Therefore, it is difficult for poor rotation of the charging roller 14 to arise.

Second Exemplary Embodiment

A second exemplary embodiment of the present invention will be described next.

Figures 6A, 6B:
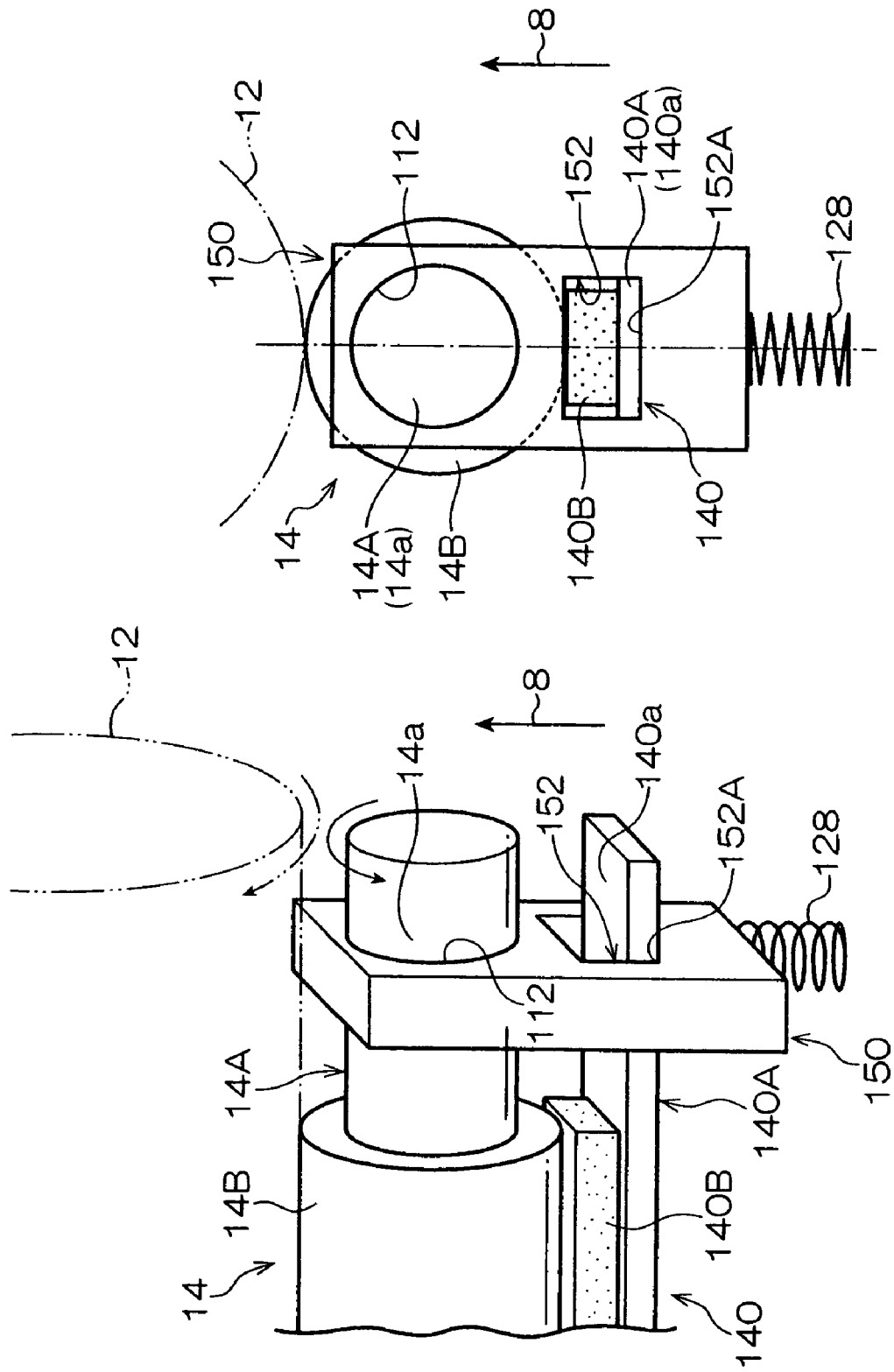
FIG. 6A is a perspective view showing a state in which a charging roller and a sponge member according to a second exemplary embodiment of the present invention are rotatably supported at a shaft-receiving member.
FIG. 6B is a side view showing the state in which the charging roller and the sponge member according to the second exemplary embodiment of the present invention are rotatably supported at the shaft-receiving member.

As shown in FIGS. 6A and 6B, in this exemplary embodiment, a sponge member (cleaning member) 140 which cleans the charging roller 14 is structured by a bar-shaped substrate 140A which extends along the axial direction of the charging roller 14, and a pad-shaped sponge layer (elastic body) 140B which is formed at one surface of the substrate 140A.

In the same way as the sponge member 100 of the first exemplary embodiment, supporting portions 140a, which are provided at the both end portions of the substrate 140A, are inserted through rectangular supporting holes 152 formed in singularly structured shaft-receiving members 150, and the sponge member 140 is, together with the charging roller 14, supported by the pair of shaft-receiving members 150. Further, as shown in FIG. 6B, the shape of the opening of the supporting hole 152 is such that the dimension thereof in the widthwise direction is substantially the same as the width of the substrate 140A (the supporting portion 140a) and the dimension thereof in the heightwise direction is larger than the thickness of the substrate 140A.

The relative positions are maintained substantially constant of the charging roller 14, the supporting portions 14a thereof at the both ends of the shaft 14A being supported at the pair of shaft-receiving portions 150, and the sponge member 140, the supporting portions 140a thereof at the both ends of the substrate 140A being supported at the pair of shaft-receiving portions 150. This is due to the sponge layer 140B of the sponge member 140 being pressed against the charging roller 14 at a predetermined load, and the supporting portions 140a of the substrate 140A of the sponge member 140 abutting and being supported by inner peripheral surface portions 152A of the supporting holes 152 at the side opposite to that of the charging roller 14. The sponge layer 140B elastically deforms along the peripheral surface of the charging roller 14 so as to form a nip portion. Further, the supporting holes 152, which abut and support the supporting portions 140a of the substrate 140A of the sponge member 140, are configurations which provide the supporting portions 140a of the substrate 140A with a degree of freedom in the direction of press-contacting the charging roller 14 (the direction of arrow 8).

In this way, when the charging roller 14 is rotated accompanying the rotation of the photosensitive drum 12, the roller surface slidingly-contacts and is cleaned by the sponge layer 140B of the sponge member 140. Further, by providing the pad-shaped sponge layer 140B, which slidingly-contacts the rotating charging roller 14, in this way at the sponge member 140 which cleans the charging roller 14, the charging roller 14 can be cleaned well by a simple and inexpensive structure.

Operation of this exemplary embodiment will be described next.

Figure 7A:
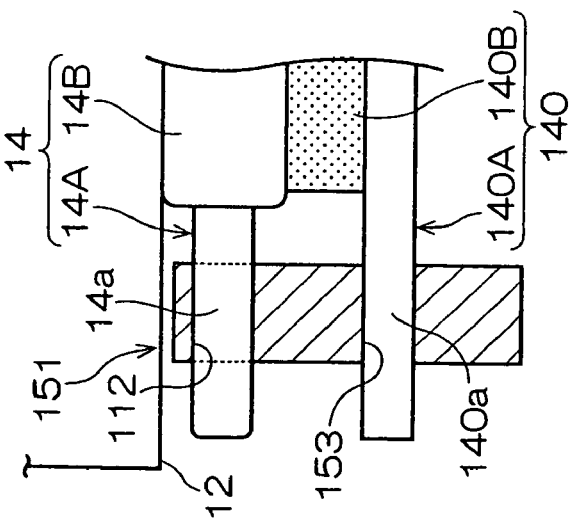
FIGS. 7A through 7C are explanatory diagrams for comparing and explaining improved effects of a mounting structure according to the second exemplary embodiment of the present invention, with respect to a conventional mounting structure of a charging roller and a sponge member.
Figure 7B:
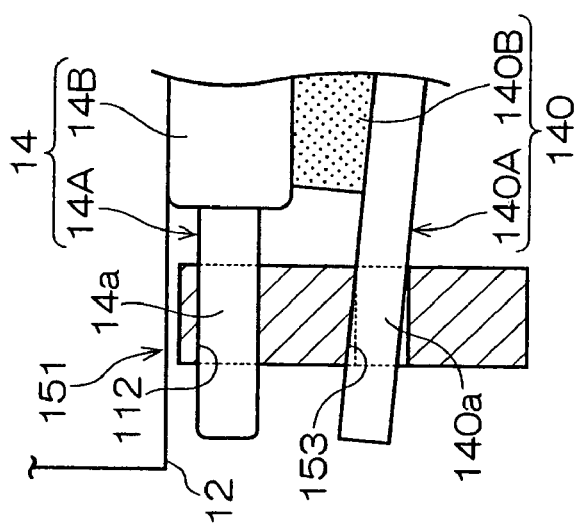

As shown in FIG. 7A, in a case in which the configuration of the opening of a supporting hole 153 formed in a shaft-receiving member 151 in order to support the sponge member 140 is substantially the same configuration as the cross-sectional configuration of the substrate 140A (the supporting portion 140a), if the sponge member 140 flexes due to poor alignment or the effects of press-contact force as shown in FIG. 7B, it is difficult for the supporting portion 140a of the substrate 140A to flex because it is fit-together with the supporting hole 153. Further, the supporting portion 140a deforms the supporting hole 153 or strongly contacts the supporting hole 153 locally. Therefore, the load (rotation resistance) which the charging roller 14 receives from the sponge member 140 is large, and it is easy for problems in the rotation to occur.

Figure 7C:
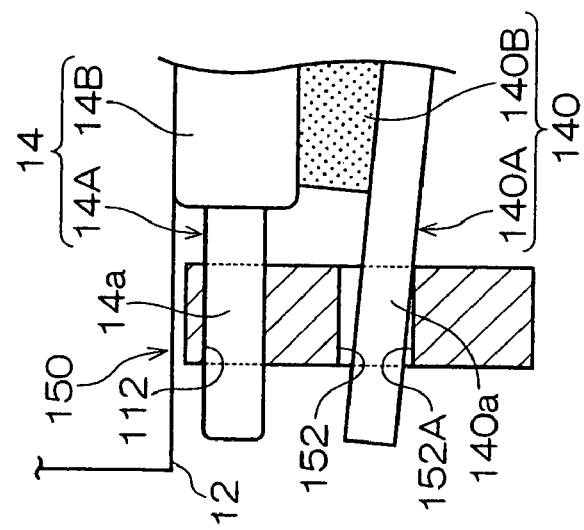

In contrast, in this exemplary embodiment, as shown in FIG. 7C, if flexure arises at the sponge member 140, the supporting portion 140a of the substrate 140A can, in a state of being supported by the supporting hole 152 of the shaft-receiving member 150, deform (be displaced) freely in the press-contacting direction (the direction of arrow 8), and therefore flexes easily. Moreover, even if the hardness of the sponge layer 140B increases due to the accumulation of contamination over time, and accompanying this, the amount of flexure increases and the amount of deformation (amount of displacement) of the supporting portion 140a increases, that increased amount can be absorbed. In this way, by supporting the sponge member 140 and making the deformability thereof in the axial direction good while causing the sponge member 140 to press-contact the charging roller 14, an increase in the load (rotation resistance) which the charging roller 14 receives from the sponge member 140 is suppressed, and a stable ability to rotate can be maintained over a long period of time.

In this exemplary embodiment, in the same way as in the first exemplary embodiment, the shaft-receiving hole 112 which rotatably supports the charging roller 14, and the supporting hole 152 which supports the sponge member 140, are provided at the single shaft-receiving member 150 and are structured integrally. At the same time, the supporting portions 14a of the both ends of the charging roller 14 and the supporting portions 140a of the both ends of the sponge member 140 are supported by the pair of shaft-receiving members 150, and the shaft-receiving members 150 are respectively urged toward the photosensitive drum 12 by the compression coil springs 128. In this way, with a simple structure, the sponge member 140 can be made to press-contact the charging roller 14 while the charging roller 14 is made to press-contact the photosensitive drum 12.

Third Exemplary Embodiment

A third exemplary embodiment of the present invention will be described next.

As shown in FIGS. 8A and 8B, in a shaft-receiving member 160 of this exemplary embodiment, a shaft-receiving groove 162, which is U-shaped in cross-section and at which the top end surface of the shaft-receiving member 160 is open, is formed as a shaft-receiving portion for supporting the charging roller 14. The inner diameter of an inner peripheral surface portion 162A, which is formed in the shape of a semicircular surface, is substantially the same as the shaft diameter of the shaft 14A (the supporting portion 14a), and the photosensitive drum 12 side, which is the top side in the drawing, of the shaft-receiving groove 162 is open. In this way, the shaft-receiving groove 162 is a shape which, at the time when the supporting portion 14a of the shaft 14A of the charging roller 14 abuts and is supported by the inner peripheral surface portion 162A, provides the supporting portion 140a with a degree of freedom in the direction of press-contacting the photosensitive drum 12 (the direction of arrow 8).

The shape of the opening of a rectangular supporting hole 164, which is formed in order to support the sponge member 140 described in the second exemplary embodiment, is substantially the same as the cross-sectional configuration of the substrate 140A (the supporting portion 140a). The supporting portion 140a of the substrate 140A, which is inserted-through, fits-together with and is supported by the supporting hole 164.

In this way, in this exemplary embodiment, when the shaft-receiving members 160, which support the charging roller 14 and the sponge member 140, are urged toward the photosensitive drum 12 by the compression coil springs 128, while the charging roller 14 press-contacts the photosensitive drum 12, the supporting portions 14a of the shaft 14A abut and are supported by the inner peripheral surface portions 162A at the shaft-receiving grooves 162 of the shaft-receiving members 160, and are disposed at predetermined positions. The sponge layer 140B of the sponge member 140, at which the supporting portions 140a of the substrate 140A are fit-together with and supported by the supporting holes 164, press-contacts the charging roller 14. In this press-contacting state, the relative positions of the charging roller 14 and the sponge member 140 are maintained substantially constant.

Operation of this exemplary embodiment will be described next.

Figure 9A:
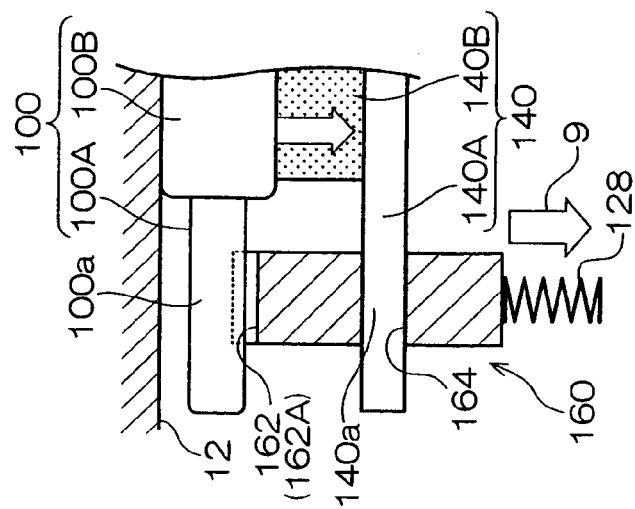
FIGS. 9A through 9C are explanatory diagrams for comparing and explaining improved effects of a mounting structure according to the third exemplary embodiment of the present invention, with respect to a conventional mounting structure of a charging roller and a sponge member.
Figure 9B:
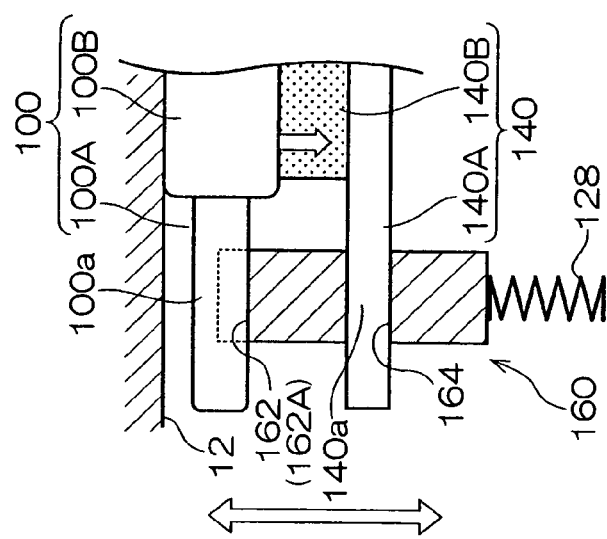
Figure 9C:
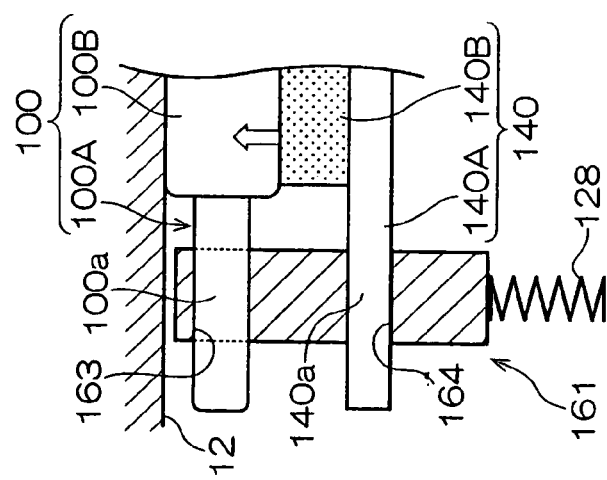

As shown in FIG. 9A, in a case in which the inner diameter of a shaft-receiving hole 163, which is formed in a shaft-receiving member 161 in order to support the charging roller 14, is substantially the same diameter as the shaft 14A (the supporting portion 14a), if the error in the precision of the alignment between the charging roller 14 and the sponge member 140 is great, or if flexure arises at the charging roller 14 due to press-contact force, the contact pressure of the supporting portion 14a of the shaft 14A with respect to the shaft-receiving hole 163 increases. Therefore, the rotation resistance increases, the ability of the charging roller 14 to move following the photosensitive drum 12 becomes poor, and it is easy for charging defects to arise.

Further, in a case in which the press-contact force received from the sponge member 140 increases due the hardness of the sponge layer 140B provided at the sponge member 140 increasing over time, the load received from the sponge member 140 increases, and the ability of the charging roller 14 to move in a following manner worsens even more.

In contrast, in this exemplary embodiment, even if poor alignment or flexure arises at the charging roller 14, the supporting portions 14a of the shaft 14A can, in a state of being supported by the shaft-receiving grooves 162 of the shaft-receiving members 160, freely be displaced and deform in the direction of press-contacting the photosensitive drum 12 (the direction of arrow 8). In this way, an increase in the rotation resistance due to a rise in the contact pressure is suppressed, and deterioration in the ability to move following the photosensitive drum 12 is suppressed. Accordingly, deterioration in chargeability of the photosensitive drum 12 by the charging roller 14 is suppressed.

Further, even in a case in which the press-contact force between the sponge member 140 and the charging roller 14 rises due to an increase in the hardness of the sponge layer 140B over time, the shaft-receiving members 160 move against the spring forces of the compression coil springs 128 in the direction opposite to the direction of the charging roller 14 press-contacting the photosensitive drum 12, in a state in which the shaft-receiving members 160 cause the charging roller 14 to press-contact the photosensitive drum 12 while they support the charging roller 14. Therefore, the press-contact force can be prevented from rising more than necessary, and an increase in the rotational load of the charging roller 14 is suppressed.

Fourth Exemplary Embodiment

A fourth exemplary embodiment of the present invention will be described next.

As shown in FIG. 10A, in a shaft-receiving member 170 of this exemplary embodiment, a shaft-receiving groove 172, which is U-shaped in cross-section (semi-circular-arc-shaped) and at which the top end surface of the shaft-receiving member 170 is open and whose inner diameter is substantially the same as the shaft diameter of the shaft 14A (the supporting portion 14a), is formed as a shaft-receiving portion for supporting the charging roller 14 in the same way as in the third exemplary embodiment. Further, a shaft-receiving hole 174, which is shaped as a long hole which is long along the press-contacting direction of the sponge member 100, is formed in the shaft-receiving member 170 as a shaft-receiving portion for supporting the rotary-contact-type sponge member 100 described in the first exemplary embodiment.

In this way, at the shaft-receiving member 170, the shaft-receiving groove 172 and the shaft-receiving hole 174 are both formed in configurations which provide the supporting portion 14a and the supporting portion 100a with a degree of freedom in the press-contacting direction. In this way, problems in the following movement of the charging roller 14 and the sponge member 100 due to poor alignment or flexure are prevented, and a good charging ability of the photosensitive drum 12 by the charging roller 14 and a good cleaning ability of the charging roller 14 by the sponge member 100 are obtained.

Further, as shown in FIGS. 11A through 11C, at the time when the charging roller 14 and the sponge member 100 are mounted to the pair of shaft-receiving members 170 which are assembled to the frame 120, as shown in FIG. 11A, first, one of the supporting portions 100a of the shaft 100A of the sponge member 100 is, while being inserted at an incline into the shaft-receiving hole 174 of one of the shaft-receiving members 170, passed-through to the back thereof. As shown in FIG. 11B, the other supporting portion 100a of the shaft 100A is aligned with the shaft-receiving hole 174 of the other shaft-receiving member 170. By inserting this other supporting portion 100a as is into the shaft-receiving hole 174 as shown in FIG. 11C, the sponge member 100 can be mounted easily.

Next, as shown in FIG. 11C, by fitting the supporting portions 14a of the both ends of the shaft 14A of the charging roller 14 into the respective shaft-receiving grooves 172 of the pair of shaft-receiving members 170, the charging roller 14 also can be mounted easily.

Further, when removing the charging roller 14 and the sponge member 100 from the pair of shaft-receiving members 170, they can easily be removed carrying out the reverse order of the mounting method described above.

In this way, in a case in which the respective shaft-receiving portions (the shaft-receiving grooves 172 and the shaft-receiving holes 174) provided in the shaft-receiving members 170 are both formed in shapes which provide the supporting portions with a degree of freedom in the press-contacting direction, the ability to attach and remove the charging roller 14 and the sponge member 100 to and from the respective shaft-receiving portions is good, and the assembling ability and recycling ability improve.

Further, in a case of applying the structure of this exemplary embodiment to the fixed-contact-type sponge member 140 described in the second exemplary embodiment, as in the case of a shaft-receiving member 180 shown in FIG. 10B, the shaft-receiving portion for supporting the charging roller 14 is made to be the shaft-receiving groove 172 which has the U-shaped cross-section and which opens in the press-contacting direction of the charging roller 14. The shaft-receiving portion for supporting the sponge member 140 is made to be a rectangular supporting hole 182 such as that described in the second exemplary embodiment whose opening dimension in the direction of thickness of the substrate 140A, which is the press-contacting direction of the sponge member 140, is larger than the thickness of the substrate 140A.

In this way, even in a structure having the sponge member 140, the ability to attach and remove the charging roller 14 and the sponge member 140 to and from the pair of shaft-receiving members 180 is good.

Fifth Exemplary Embodiment

A fifth exemplary embodiment of the present invention will be described next.

As shown in FIG. 12C, in this exemplary embodiment, the axial direction length of a sponge member 200 is formed to be a little shorter than the charging roller 14. In the assembled state, supporting portions 200a, which are provided at the both ends of a shaft 200A of the sponge member 200, are disposed at the axial direction inner sides of the supporting portions 14a which are provided at the both ends of the shaft 14A of the charging roller 14.

As shown in FIG. 12A, respective shaft-receiving portions, which support the respective supporting portions, of shaft-receiving members 190 corresponding to the charging roller 14 and the sponge member 200 are shaft-receiving grooves 192, 194 which have U-shaped cross-sections and which open in the press-contacting direction. When the shaft-receiving members 190 are assembled to the frame 120, the shaft receiving grooves 194 which support the sponge member 200 are disposed at the axial direction inner sides of the shaft-receiving grooves 192 which support the charging roller 14.

In this way, also at the shaft-receiving member 190 of this exemplary embodiment, the shaft receiving grooves 192, 194 are both formed in configurations which provide the supporting portion 14a and the supporting portion 200a with a degree of freedom in the press-contacting direction. Therefore, problems in the following movement of the charging roller 14 and the sponge member 200 due to poor alignment or flexure are prevented, and a good charging ability of the photosensitive drum 12 by the charging roller 14 and a good cleaning ability of the charging roller 14 by the sponge member 200 are obtained.

Further, at the time of mounting the charging roller 14 and the sponge member 200 to the pair of shaft-receiving members 190 which are assembled to the frame 120, as shown in FIGS. 12B and 12C, the sponge member 200 is easily mounted merely by fitting the supporting portions 200a of the both ends of the shaft 200A of the sponge member 200 into the shaft-receiving grooves 194 of the shaft-receiving members 190. The charging roller 14, in the same way as in the fourth exemplary embodiment, is easily mounted merely by fitting the supporting portions 14a of the both ends of the shaft 14A into the shaft-receiving grooves 192 of the shaft-receiving members 190.

In this way, in this exemplary embodiment, the supporting portions 200a of the sponge member 200 and the shaft-receiving grooves 194 which support the supporting portions 200a are disposed at the axial direction inner sides of the supporting portions 14a of the charging roller 14 and the shaft-receiving grooves 192 which support the supporting portions 14a. In this way, in particular in a structure such as that described above in which the sponge member 200 is set first and the charging roller 14 is set and mounted thereafter, the ability to attach and remove the respective members is good, and the ability to assemble and the ability to recycle are further improved.

The present invention has been described in detail above in accordance with the first through fifth exemplary embodiments, but the present invention is not limited to the embodiments, and various other aspects can be implemented within the scope of the present invention.

For example, in the above-described exemplary embodiments, the charging roller 14 and the sponge members 100, 140, 200 are supported at the shaft-receiving members 110, 150, 170, 180, 190. However, a structure may be used in which they are supported by separate members and are made to press-contact by individual urging means.

Further, the charging roller 14 is made to contact the lower portion of the photosensitive drum 12, and the sponge member 100, 140 is made to contact the lower portion of the charging roller 14. However, the positional relationship between the photosensitive drum 12, the charging roller 14, and the sponge member 100, 140 is not limited to the same. For example, the present invention can also be applied to a structure in which the charging roller is made to contact the upper portion of the photosensitive drum and the sponge member is made to contact the upper portion of the charging roller, or the like.

Further, the image forming device which applies the present invention is not limited to the four-cycle-system structure in which the formation of a toner image onto the photosensitive drum 12 is repeated four times by using the rotary developing device 18, as in the above-described exemplary embodiments. For example, even in a structure in which yellow, magenta, cyan, and black image forming units are provided in parallel along the moving direction of an intermediate transfer belt, the present invention can be applied to the photosensitive drums, the charging rollers and the sponge members of the respective image forming units.

While the present invention has been illustrated and described with respect to some specific embodiments thereof, it is to be understood that the present invention is by no means limited thereto and encompasses all changes and modifications which will become possible without departing from the spirit and scope of the present invention.

What is claimed is:

1. An image forming device comprising:
    a charging roller that charges a body-to-be-charged by the charging roller being rotated due to press-contacting to the rotating body-to-be-charged;
    a first receiving portion that supports a supporting portion provided at the charging roller, and causes the charging roller to press-contact the body-to-be-charged;
    a cleaning member that press-contacts a surface of the charging roller and cleans the charging roller; and
    a second receiving portion that supports a supporting portion provided at the cleaning member, and causes the cleaning member to press-contact the charging roller,
    wherein at least one of the first receiving portion and the second receiving portion has a configuration which imparts a degree of freedom at the first receiving portion side to the supporting portion of the charging roller in a direction of press-contacting the body-to-be-charged, and which imparts a degree of freedom at a second receiving portion side to the supporting portion of the cleaning member in a direction of press-contacting the charging roller.

2. An image forming device, comprising:
    a charging roller that charges a body-to-be-charged by the charging roller being rotated due to press-contacting to the rotating body-to-be-charged;
    a first receiving portion that supports a supporting portion of the charging roller, and causes the charging roller to press-contact the body-to-be-charged;
    a cleaning member that press-contacts a surface of the charging roller and cleans the charging roller; and
    a second receiving portion that supports a supporting portion of the cleaning member, and causes the cleaning member to press-contact the charging roller,
    wherein at least one of the first receiving portion and the second receiving portion has a configuration which imparts a degree of freedom at the first receiving portion side to the supporting portion of the charging roller in a direction of press-contacting the body-to-be-charged, and which imparts a degree of freedom at the second receiving portion side to the supporting portion of the cleaning member in a direction of press-contacting the charging roller,
    wherein the cleaning member is a roller-shaped rotating body that is rotated by the charging roller that rotates, wherein a shaft-receiving hole through which the cleaning member is inserted rotatably is formed at the second receiving portion, and wherein an inner diameter of the shaft-receiving hole is formed to be larger than a shaft diameter of the supporting portion of the cleaning member.

3. The image forming device of claim 2, further comprising:

a holding member that includes the first receiving portion and the second receiving portion, supports the charging roller and the cleaning member, and maintains the relative positions of the charging roller and the cleaning member substantially constant; and an urging member that urges the holding member toward the body-to-be-charged, and causes the charging roller to press-contact the body-to-be-charged.

4. The image forming device of claim 2, wherein the supporting portion of the cleaning member and the second receiving portion that supports the supporting portion are disposed at an axial direction inner side of the supporting portion of the charging roller and the first receiving portion that supports the supporting portion.

5. The image forming device of claim 2, wherein the first receiving portion has an opening at an upper part thereof, the opening imparting the degree of freedom at the first receiving portion side to the supporting portion to the charging roller in a direction of press-contacting the body-to-be-charged.

6. An image forming device, comprising:

a charging roller that charges a body-to-be-charged by the charging roller being rotated due to press-contacting to the rotating body-to-be-charged;

a first receiving portion that supports a supporting portion provided at the charging roller, and causes the charging roller to press-contact the body-to-be-charged;

a cleaning member that press-contacts a surface of the charging roller and cleans the charging roller; and a second receiving portion that supports a supporting portion provided at the cleaning member, and causes the cleaning member to press-contact the charging roller, wherein at least one of the first receiving portion and the second receiving portion has a configuration which imparts a degree of freedom at the first receiving portion side to the supporting portion of the charging roller in a direction of press-contacting the body-to-be-charged, and which imparts a degree of freedom at the second receiving portion side to the supporting portion of the cleaning member in a direction of press-contacting the charging roller, wherein the cleaning member is structured as a bar-shaped substrate and a pad-shaped elastic body formed at one surface of the substrate, wherein the pad-shaped elastic body is made to press-contact the charging roller, and a rectangular supporting hole through which the supporting portion of the cleaning member is inserted is formed at the second receiving portion, and wherein a dimension of the supporting hole in a direction of thickness of the substrate is formed to be larger than a thickness of the substrate.

7. The image forming device of claim 6, wherein the supporting portion of the cleaning member and the second receiving portion that supports the supporting portion are disposed at an axial direction inner side of the supporting portion of the charging roller and the first receiving portion that supports the supporting portion.

8. The image forming device of claim 6, wherein the first receiving portion has an opening at an upper part thereof, the opening imparting the degree of freedom at the first receiving portion side to the supporting portion to the charging roller in a direction of press-contacting the body-to-be-charged.

9. The image forming device of claim 6, further comprising:

a holding member that includes the first receiving portion and the second receiving portion, supports the charging roller and the cleaning member, and maintains the relative positions of the charging roller and the cleaning member substantially constant; and an urging member that urges the holding member toward the body-to-be-charged, and causes the charging roller to press-contact the body-to-be-charged.

10. An image forming device, comprising:

a body to be charged;

a charging roller that charges the body by the charging roller being rotated due to press-contacting to the rotating body-to-be-charged;

a roller-shaped cleaning member that cleans the charging roller by press-contacting the charging roller and that is rotated with the charging roller;

a first receiving portion that supports the charging roller and causes the charging roller to press-contact the body;

a second receiving portion having a shaft receiving hole into which a shaft of the cleaning member is rotatably inserted to support the cleaning member so that the cleaning member press-contacts the charging roller, wherein an inner diameter of the shaft-receiving hole is formed to be larger than a diameter of the shaft of the cleaning member to impart a degree of freedom to the cleaning member in a direction of press-contacting the charging roller.

11. An image forming device, comprising:

a body to be charged;

a charging roller that charges the body by the charging roller being rotated due to press-contacting to the rotating body-to-be-charged;

a cleaning member that cleans the charging roller by press-contacting the charging roller, the cleaning member including a bar-shaped substrate and a pad-shaped elastic body disposed on a surface of the substrate in contact with the charging roller;

a first receiving portion that supports the charging roller and causes the charging roller to press-contact the body;

a second receiving portion having a rectangular receiving hole into which the substrate of the cleaning member is inserted to support the cleaning member so that the cleaning member press-contacts the charging roller, wherein a dimension of the rectangular receiving hole in the direction of press contacting the charging roller is greater than a dimension of the substrate hole in the direction of press contacting the charging roller to imparts a degree of freedom to the cleaning member in a direction of press-contacting the charging roller.

* * * * *